(12) United States Patent
Vallance

(10) Patent No.: US 8,794,864 B2
(45) Date of Patent: Aug. 5, 2014

(54) CAMMING ELEMENT FOR FASTENER

(75) Inventor: William Ernest Taylor Vallance, Marlow (GB)

(73) Assignee: Titus International PLC, Uxbridge (GB)

( * ) Notice: Subject to any disclaimer, the term of this patent is extended or adjusted under 35 U.S.C. 154(b) by 0 days.

(21) Appl. No.: 13/059,655

(22) PCT Filed: Aug. 7, 2009

(86) PCT No.: PCT/GB2009/001968
§ 371 (c)(1),
(2), (4) Date: Apr. 19, 2011

(87) PCT Pub. No.: WO2010/020754
PCT Pub. Date: Feb. 25, 2010

(65) Prior Publication Data
US 2011/0206478 A1    Aug. 25, 2011

(30) Foreign Application Priority Data
Aug. 20, 2008   (GB) .................................. 0815236.5

(51) Int. Cl.
*F16B 2/02*   (2006.01)
*F16B 7/04*   (2006.01)

(52) U.S. Cl.
USPC ............... 403/350; 403/DIG. 8; 403/DIG. 12

(58) Field of Classification Search
USPC ........... 403/314, 350–352, 367, 374.1, 409.1, 403/DIG. 8, DIG. 13, DIG. 12; 411/398, 402, 411/403; 312/257.1, 263, 111
See application file for complete search history.

(56) References Cited

U.S. PATENT DOCUMENTS

| 4,131,376 A | * | 12/1978 | Busse .............................. 403/12 |
| 4,599,011 A |   | 7/1986  | Tashiro et al. |
| 4,810,127 A | * | 3/1989  | Hettich ......................... 403/231 |
| 5,284,401 A | * | 2/1994  | Harley ........................ 403/409.1 |
| 5,567,081 A | * | 10/1996 | Vallance ....................... 403/292 |
| 5,772,353 A | * | 6/1998  | Grieser et al. ................ 403/231 |
| 5,788,395 A |   | 8/1998  | Grieser et al. |
| 5,810,505 A |   | 9/1998  | Henriott et al. |
| 6,247,770 B1 | * | 6/2001  | Glass ............................ 312/263 |
| 6,276,867 B1 |   | 8/2001  | Vallance |
| 6,848,855 B2 |   | 2/2005  | Hasler |
| 6,939,075 B2 | * | 9/2005  | Walz ............................. 403/231 |
| 7,223,045 B2 |   | 5/2007  | Migli |

FOREIGN PATENT DOCUMENTS

| CN | 2294350 Y | 10/1998 |
| DE | 1242055 B | 6/1967 |

* cited by examiner

*Primary Examiner* — Daniel P Stodola
*Assistant Examiner* — Jonathan Masinick
(74) *Attorney, Agent, or Firm* — Alan Kamrath; Kamrath IP Lawfirm, P.A.

(57) ABSTRACT

A camming element (1) for forming a joint between two members has a pair of jaws (15,16) for engaging a head of a dowel member. The camming element has a torque drive connector (10) which is radially offset to its rotational axis. The camming element has a top plate (22) which is designed to sit below the surface of its mounting member in use. The camming element may be concealed in use by a cover cap.

20 Claims, 10 Drawing Sheets

CAMMING ELEMENT FOR FASTENER

BACKGROUND

This invention relates to camming elements for fasteners, and particularly, though not exclusively, to camming elements for fasteners for use in the furniture industry.

A known fastener for holding two members together is illustrated in FIGS. 1 to 3. The fastener includes a camming element 1' and a dowel 2'. The dowel 2' is fixably attached to a first one of the members 3', by a screw thread, for example. The other, second, member 4' has a circular hole 5' in which the camming element 1' can rotate, and a bore 6' perpendicular to and intersecting the circular hole 5', whereby the dowel 2' can be inserted into the bore 6' so that a head 7' of the dowel 2' protrudes into the circular hole 5'.

Rotation of the camming element 1' causes first and second camming surfaces 8', 9' of the camming element to engage with the head 7' of the dowel 2', and further rotation of the camming element 1' pulls the head 7' of the dowel 2' further into the circular hole 5'. This, combined with the attachment of the dowel 2' to the first member 3', causes the first member 3' to be pulled toward and fastened to the second member 4'.

Rotation of the camming element 1' is effected by applying torque to a torque connecter 10', an example of which is a cross-head screw slot that allows the rotation and camming action of the camming element 1' to be driven using a standard screwdriver 11'.

Conceptually, the camming element 1' can be thought of as roughly cylindrical, being formed of three coaxially arranged spaced discs. The first of these discs has an outer surface along part of the circumference of the cylinder for contacting the circular hole 5' in the second member 4'. The disc is cut away to produce the first camming surface 8', which is to contact the head of the dowel 2'. The second disc is shaped similarly to the first, and is positioned such that there is a slot between the first and second discs. The third disc is positioned so that second disc is between the first and third discs. The third disc is not cut away, and has the torque connecter 10' at its centre. The third disc has the function of providing a covering for the circular hole 5'. It should be noted that the phrase "cut away" is used to describe the shape of the camming element 1', and does not imply a particular method of manufacture.

In the field of camming fasteners, reduction of weight and materials is considered desirable. This is particularly true when the fasteners are made from expensive materials, such as zinc. In this case, a reduction in weight, or equivalently the amount of raw material required, can lead to a considerable reduction in cost. Weight can be reduced by coring. Coring is well known in the art and is a process of removing unnecessary material from a component. As is well known, the "removal" of material can take place at the design stage, and does not necessarily require physical removal of material. In relation to camming fasteners, it is known to perform coring from the first and second discs by removal of material from the faces between the first and second discs. FIGS. 1 and 3 show an example of a conventional camming element with first and second discs having cored inside faces 13' and 14'.

In the known camming fasteners, the camming element can tilt within the circular hole, leading to the first 3' and second 4' members becoming loose with respect to each other. This is undesirable, and can lead to a loose joint and failure of the fastener. For example, when the fasteners are used in the furniture industry, tilting of the camming element 1' can lead to wobbly furniture.

In known designs, it is possible for excessive torque to be applied via the torque connector 10', leading to damage or destruction of the camming element 1'. In particular, the third disc, via which torque is applied, can shear off the second disc. In commercially available fasteners, it is possible for the camming element 1' to be damaged or destroyed by torques that can typically be applied manually with a standard screwdriver.

SUMMARY

The present invention provides a camming element for a device for forming a joint between two members, the camming element comprising: a first engagement element having a first cylindrical outer surface, a first curved camming surface, and a first wall portion between the first outer surface and the first camming surface; a second engagement element having a second cylindrical outer surface, a second curved camming surface and a second wall portion formed between the second outer surface and the second camming surface, with the second engagement element axially spaced and coaxial with the first engagement element; and a slot between the first and second engagement elements. A width of the first cylindrical outer surface in an axial direction is greater than a thickness of the first wall portion in the axial direction. The camming element is rotatably mountable, in use, in a hole in one of the members. The first and second camming surfaces are engageable, in use, with a head portion of a fastening element which is connectable, in use, to the other member. Rotation of the camming element in a first direction serves, in use, to draw the members together by action of the first and second camming surfaces pulling on the head portion of the fastening element.

The invention also provides a camming element for a device for forming a joint between two members. The camming element includes a first engagement element having a first cylindrical outer surface, a first curved camming surface, and a first wall portion between the first outer surface and the first camming surface; a second engagement element having a second cylindrical outer surface; a second curved camming surface and a second wall portion formed between the second outer surface and the second camming surface, with the second engagement element axially spaced and coaxial with the first engagement element; and a slot between the first and second engagement elements. A face of the first wall portion facing away from the second engagement element is cored. The camming element is rotatably mountable, in use, in a hole in one of the members. The first and second camming surfaces are engageable, in use, with a head portion of a fastening element which is connectable, in use, to the other member. Rotation of the camming element in a first direction serves, in use, to draw the members together by action of the first and second camming surfaces pulling on the head portion of the fastening element.

The invention further provides a camming element for a device for forming a joint between two members. The camming element includes a first engagement element having a first cylindrical outer surface, a first curved camming surface, and a first wall portion between the first outer surface and the first camming surface; a second engagement element having a second cylindrical outer surface, a second curved camming surface and a second wall portion formed between the second outer surface and the second camming surface, with the second engagement element axially spaced and coaxial with the first engagement element; a slot between the first and second engagement elements; and a torque coupling section for applying a torque parallel to the axis of the first and second cylindrical outer surfaces. The torque coupling section is radially displaced from the rotational axis of the camming element. A face of the second wall portion facing away from the slot and the second curved camming surface are exposed when viewed axially. The camming element is rotatably mountable, in use, in a hole in one of the members. The first and second camming surfaces are engageable, in use, with a head portion of a fastening element which is connectable, in use, to the other member. Rotation of the camming element in a first direction serves, in use, to draw the members together by action of the first and second camming surfaces pulling on the head portion of the fastening element.

The invention further provides a camming element for a device for forming a joint between two members, with the camming element comprising:
  a first engagement element having a first cylindrical outer surface and a first curved camming surface;
  a second engagement element having a second curved camming surface and axially spaced from the first engagement element, with a slot between the first and second engagement elements;
  a plate element having a cylindrical outer surface and axially spaced from and coaxial with the first engagement element, with the second engagement element lying between the plate element and the first engagement element, with the camming element rotatably mountable, in use, in a hole in one of the members, with the first and second camming surfaces engageable, in use, with a head portion of a fastening element which is connectable, in use, to the other member, with rotation of the camming element in a first direction serving, in use, to draw the members together by action of the first and second camming surfaces pulling on the head portion of the fastening element, and with the axial length of the camming element from its first engagement element to its plate element being less than the depth of the hole in its mounting member, whereby the plate element lies below the surface of the mounting member in use.

DESCRIPTION OF THE DRAWINGS

By way of example, embodiments of the invention will now be described with reference to the accompanying drawings, in which.

DESCRIPTION

Embodiment 1

Figure 1:
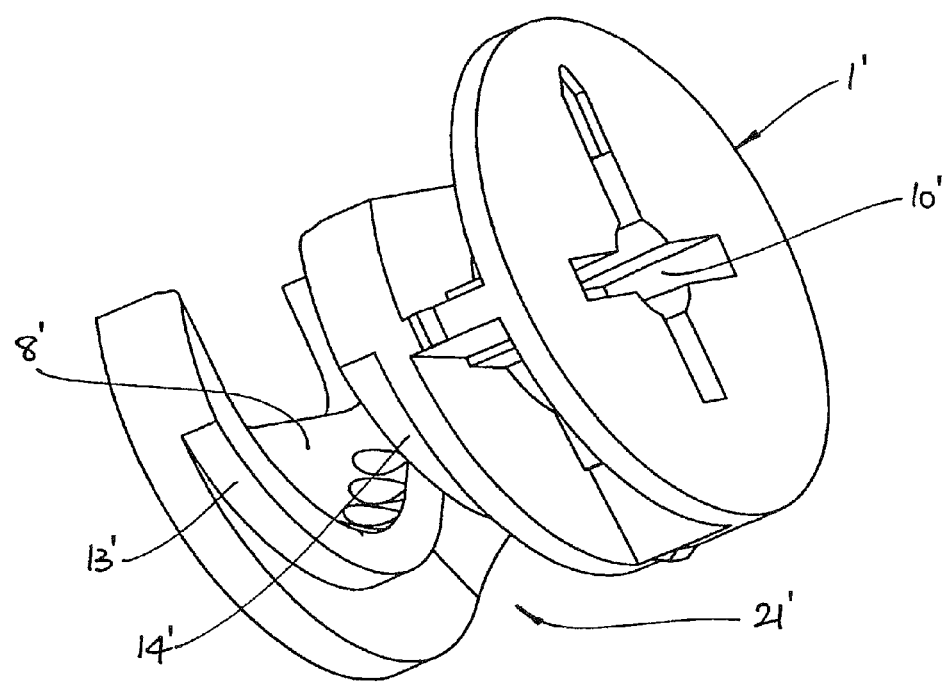
FIG. 1 is a perspective view of a known camming element.
Figure 2:
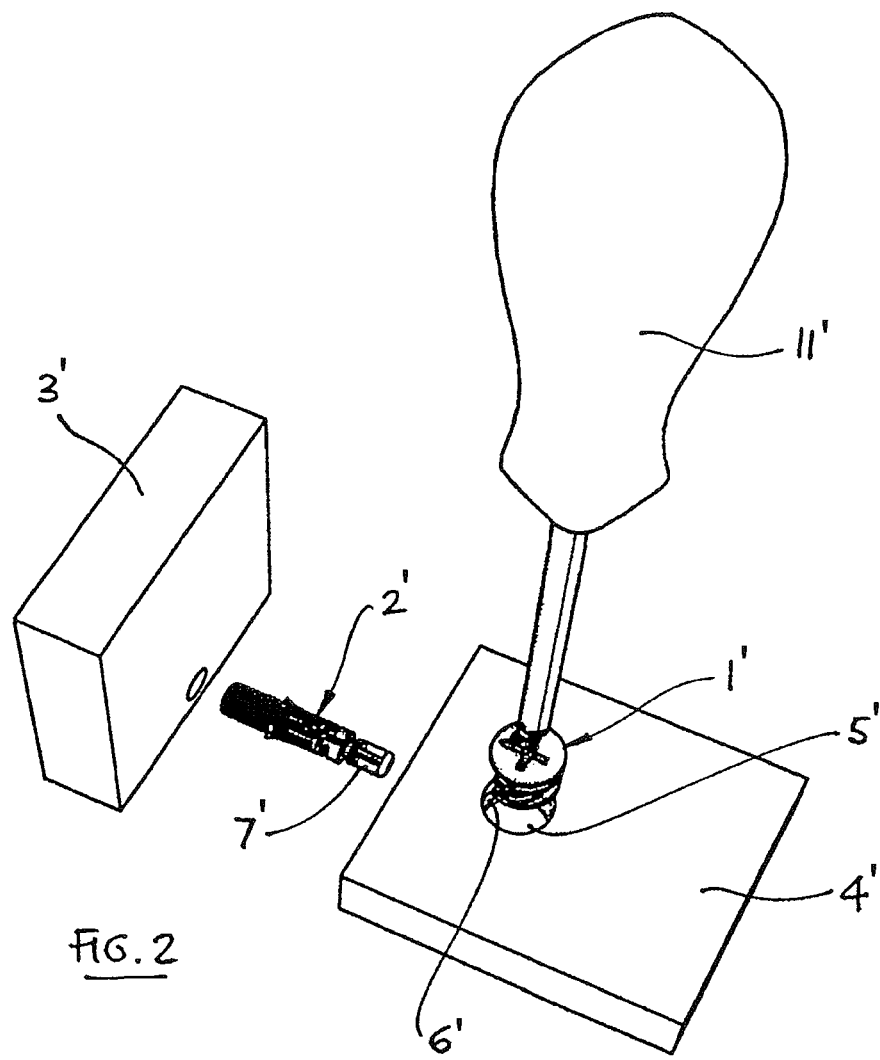
FIG. 2 is an exploded view of a known connector in use.
Figure 3:
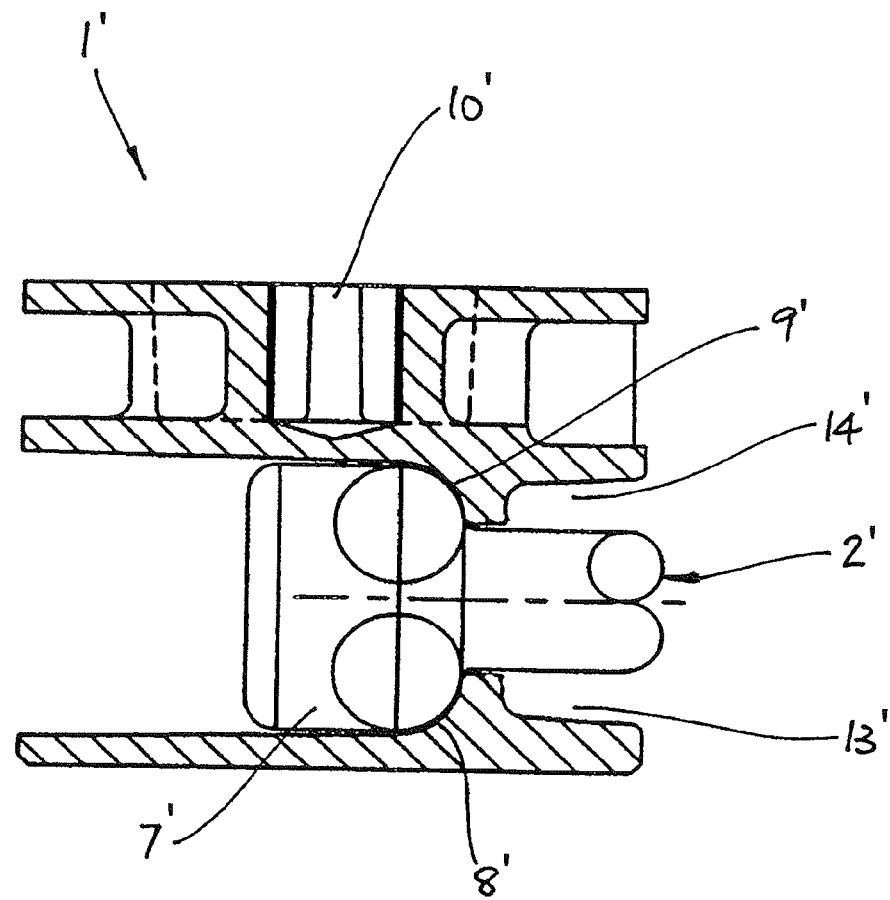
FIG. 3 shows a cross section of a known connector.
Figure 4A:
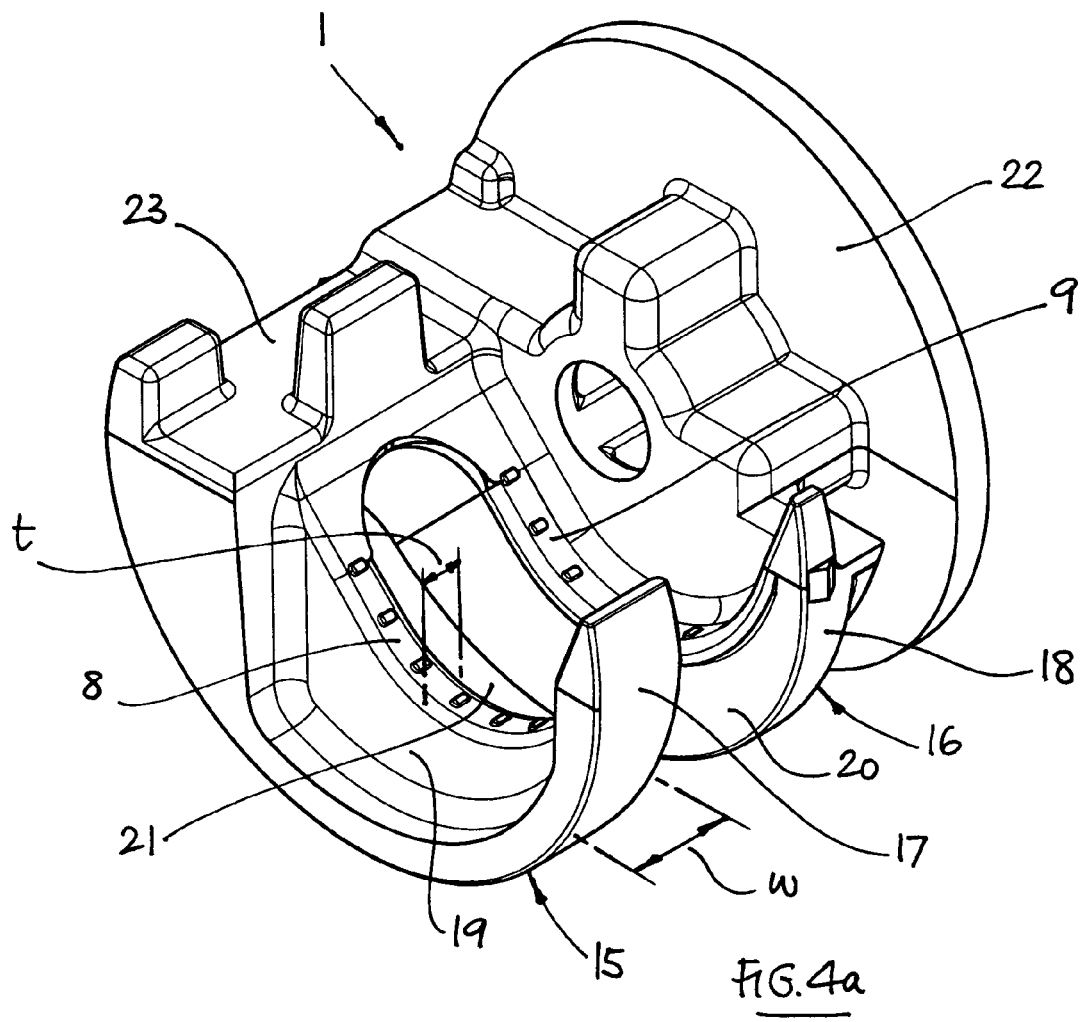
FIG. 4a is a perspective view of a first embodiment of a camming element according to the invention.
Figure 4B:
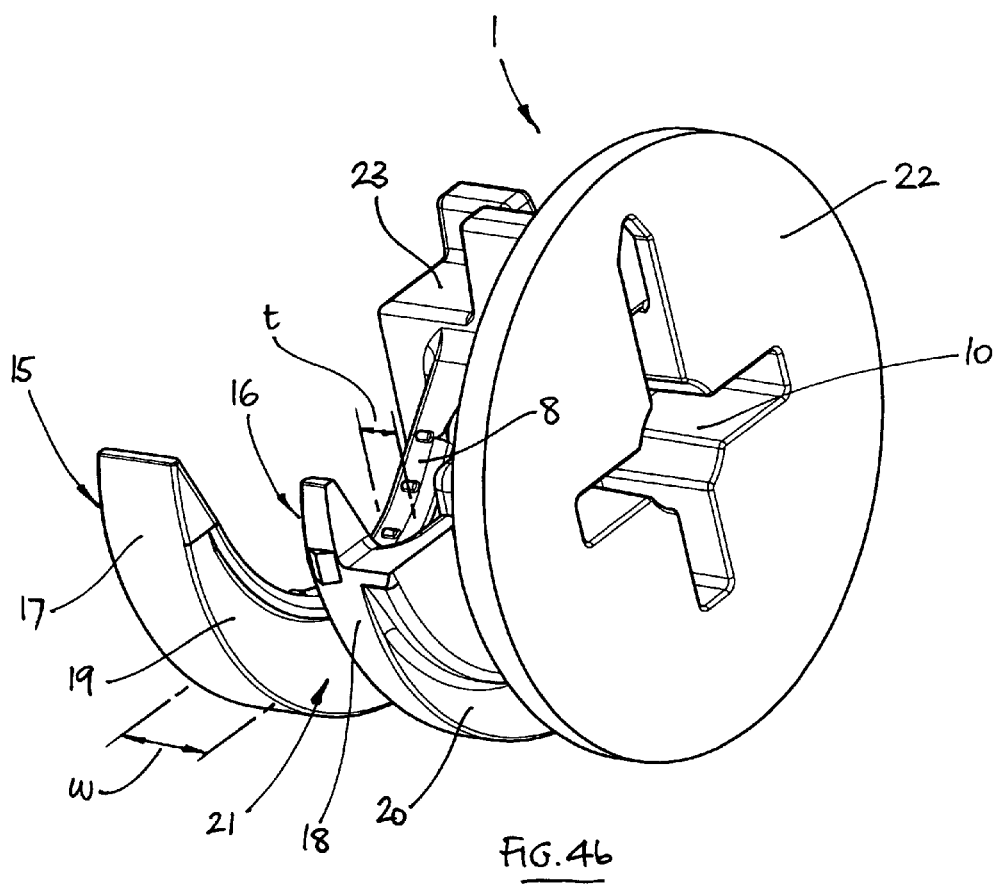
FIG. 4b is another perspective view of the first embodiment.

FIGS. 4a and 4b show a first embodiment. A camming element 1 according to this embodiment has first 15 and second 16 engagement elements, which form a pair of jaws. The outer surface of each of the first 15 and second 16 engagement elements (first outer surface 17 and second outer surface 18, respectively) is a cylindrical surface. As used herein, the term cylindrical surface describes a surface lying on the surface of a cylinder, but it does necessarily occupy the whole circumference of the cylinder. Preferably, the cylinder is a right circular, or substantially a right circular. Preferably, the surface of the cylinder is curved. In the present embodiment, the outer surface is convex.

The first 15 and second 16 engagement elements are coaxial and axially separated.

The first 15 and second 16 engagement elements have respective first 8 and second 9 camming surfaces, each of which is a curved surface adapted to contact the head 7 of a dowel 2. The first and second caroming surfaces 8, 9 may have ridges formed thereon, to grip the head 7 of the dowel 2. In the present embodiment the first and second camming surfaces 8, 9 are inside the cylindrical surface, and face generally inwardly of the cylindrical surface, to be concave.

Between the first outer surface 17 and the first camming surface 8 is a first wall portion 19. The first wall portion is substantially transverse to the cylinder axis. The faces of the first wall portion 19 may be perpendicular to the surface of the cylinder. Similarly, a second wall portion 20 is between the second outer surface 18 and the second camming surface 9.

Between the jaws formed by the first 15 and second 16 engagement elements is a slot 21. The slot 21 is intended to receive the neck of the dowel 2.

According to the present embodiment, the first outer surface 17 has a width, w, in an axial direction which is greater than the thickness, t, of the first wall portion 19 in the axial direction. Preferably, as in the present embodiment, the first outer surface 17 extends beyond the first wall portion 19 in a direction parallel to the axial direction and away from the second engagement portion 16. In this case, the coring is easier to produce.

It has been discovered that the reason for the problematic tilting of the conventional camming element is a result of the circular hole 5 (into which the camming element is to be placed) meeting the bore 6 (in which the dowel 2 is placed). In use, the first outer surface 17 is braced against the inner surface of the circular hole 5, and the presence of the bore 6 effectively reduces the area against which the camming element can be braced. This can lead to the camming element digging into the side of the circular hole 5 and thereby tilting.

The above structure according to the embodiment leads to improved support for the camming element 1 when in use, because there is increased contact area between the first outer surface 17 and the side of the circular hole 5 in which the camming element rotates.

Furthermore, since the first wall portion 19 is thinner than the width w of the first outer surface 17, less material is required compared with the case where the first wall portion 19 is the same thickness t as the width w of the first outer surface 17. Therefore, the present embodiment allows a reduction in weight and raw materials.

As can be seen in FIG. 4a, the face of the first wall portion 19 facing axially outwardly of the camming element 1 is cored to produce the above-mentioned relationship between the thickness t of the first wall portion 19 and the width w of the outer surface 17. That is, material is removed from the first wall portion 19 of the first engagement element 15 on the side that is away from the slot 21 and the second engagement element 16. This allows a reduction in the weight of the camming element 1 without reducing the width w of the first outer surface 17. Coring the side facing away from the second engagement element 16 simplifies the manufacturing process. Here coring is used as described previously, and physical removal of material is not necessarily required.

According to the present embodiment, the camming element 1 also has a disc-shaped top plate 22, contiguous with the second engagement element 16. The top plate 22 is preferably coaxial with the first 15 and second 16 engagement elements, and preferably has a radius substantially the same as the first 17 and second 18 outer surfaces. The top plate 22 thus conceals the first and second engagement elements 15, 16 when the cam is in use.

The top plate 22 is provided with a torque coupling section 10, which allows a torque to be applied to the camming element 1. The torque is applied to cause rotation of the camming element 1 about its axis. Therefore, the torque is directed along the axis of the camming element 1, since the torque is a vector quantity equal to the cross product of the radial vector (from the fulcrum to the point where a force is applied) and the force, and the direction of torque is given by a right hand grip rule.

The torque coupling section 10 is a depression that mates with the head of a screwdriver.

Embodiment 2

Figure 5A:
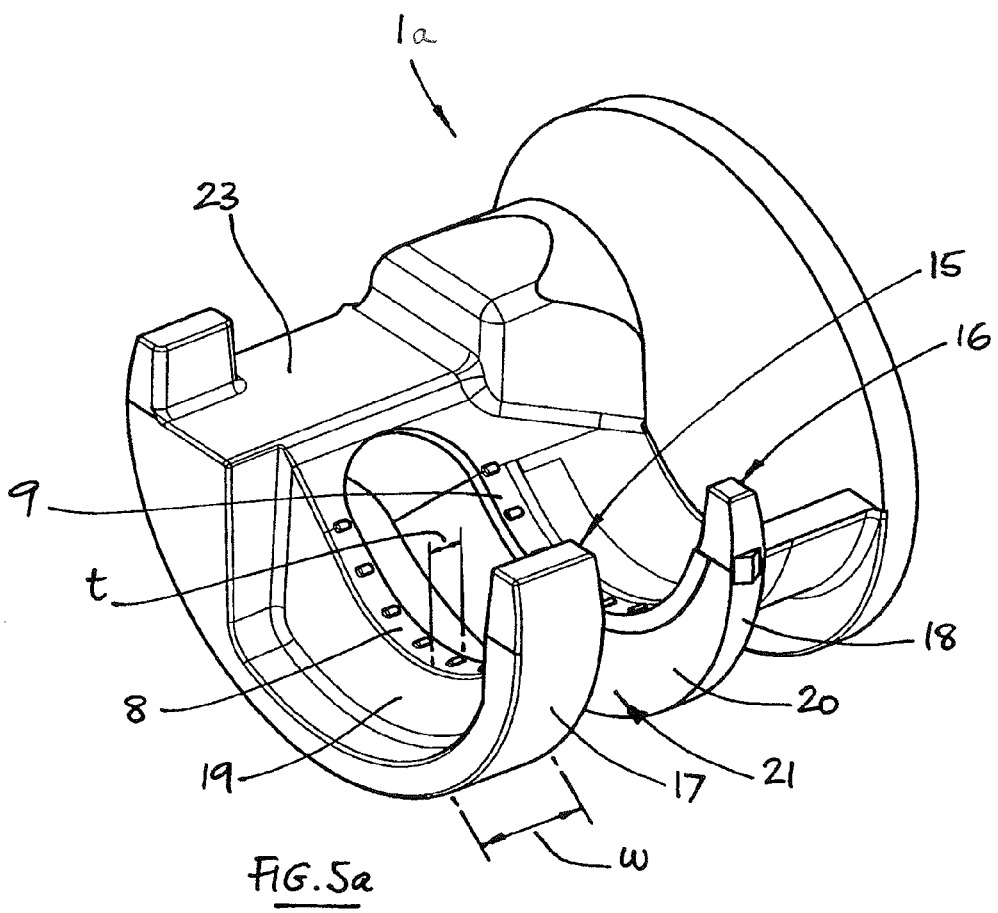
FIG. 5a is a perspective view of a second embodiment of a camming element according to the invention.
Figure 5B:
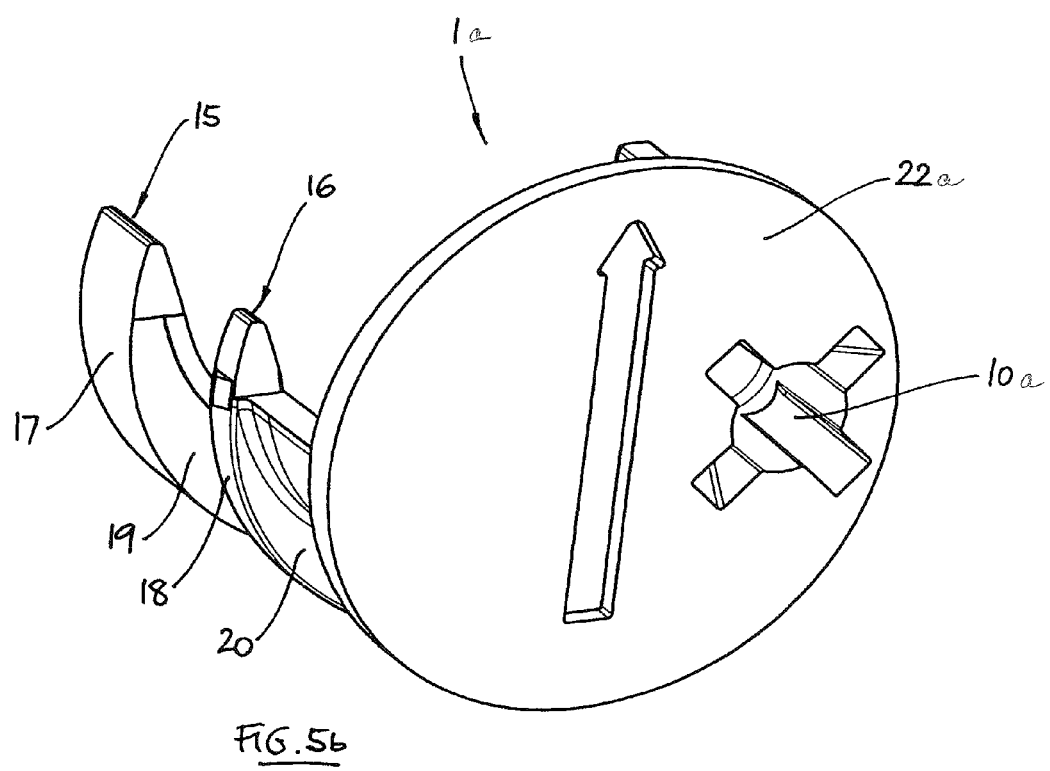
FIG. 5b is another perspective view of the second embodiment.

An example of a camming element 1a according to a second embodiment is shown in FIGS. 5a and 5b. The camming element 1a of the second embodiment is similar to the camming element 1 of the first embodiment with regard to the structure of the first 15 and second 16 engagement elements, the slot 21, the first 17 and second 18 outer surfaces, and the first 8 and second 9 camming surfaces. However, the top plate 22a of the second embodiment differs from that of the first embodiment in that the torque coupling section 10a is radially displaced from the axis of the first 17 and second 18 outer surfaces. According to this embodiment, the torque coupling section 10a allows a torque to be applied parallel to but not along the axis of the first 17 and second 18 outer surfaces.

In this case, the centre portion of the top plate 22a is not required to be so thick, as the torque coupling section 10a is now formed at an off-centre position where material interconnecting the top plate 22a and the second engagement element 16 is present. More particularly, the torque coupling section 10a is preferably located axially relative to a spine section 23. The spine section 23 extends substantially parallel to the axis and interconnects the top plate 22a and both of the first and second engagement elements 15, 16.

It has been discovered that a camming element 1 according to the second embodiment has increased strength, and is less prone to shearing of the top plate 22 from the second engagement element 16. This increase in strength and resistance to breakage can be achieved, even though the amount of material connecting the top plate 22 to the second engagement element 16 is reduced, allowing a reduction in weight and cost. More particularly, the camming element 1 according to the second embodiment, when in use, does not rotate about the torque applied to the torque coupling section 10, but instead rotates about an axis parallel to the torque. Due to the resultant mechanical advantage, the applied torque necessary to install the camming member 1 is reduced, and this reduces shearing of the top plate 22.

Embodiment 3

Figure 6A:
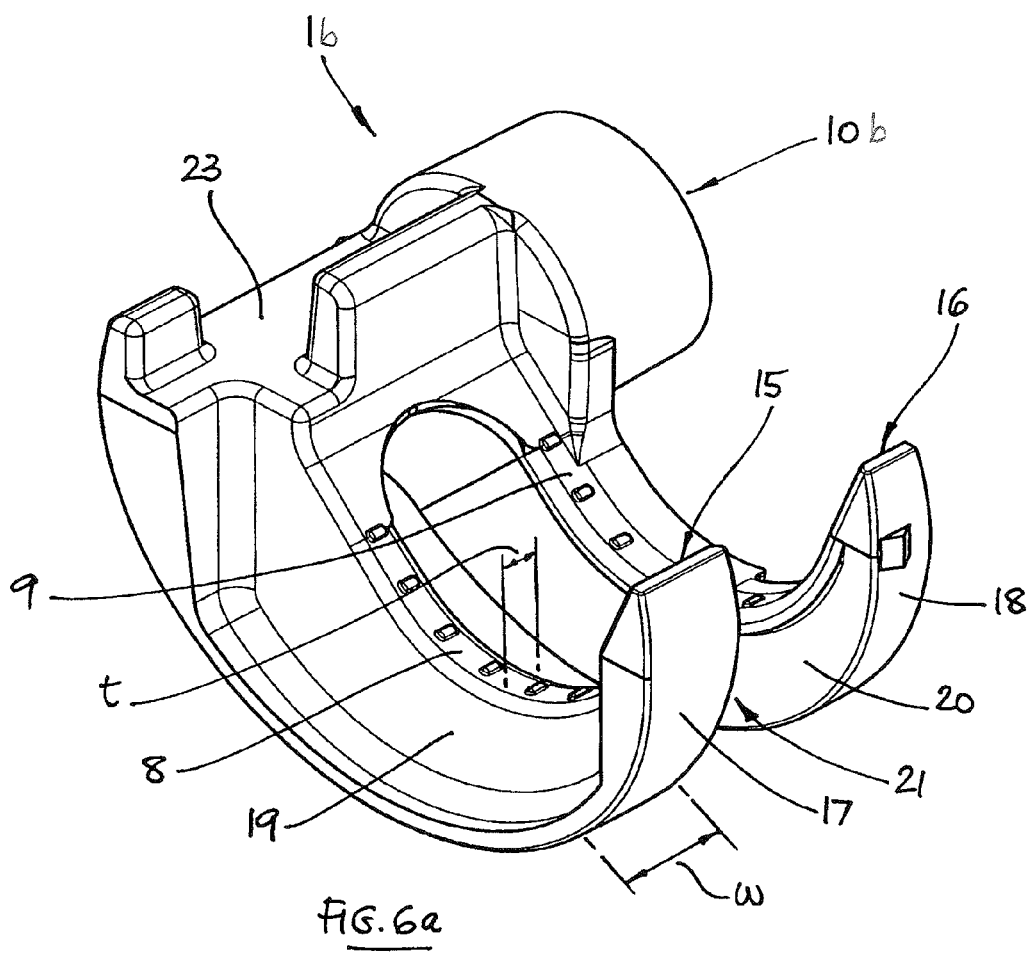
FIG. 6a is a perspective view of a third embodiment of a camming element according to the invention.
Figure 6B:
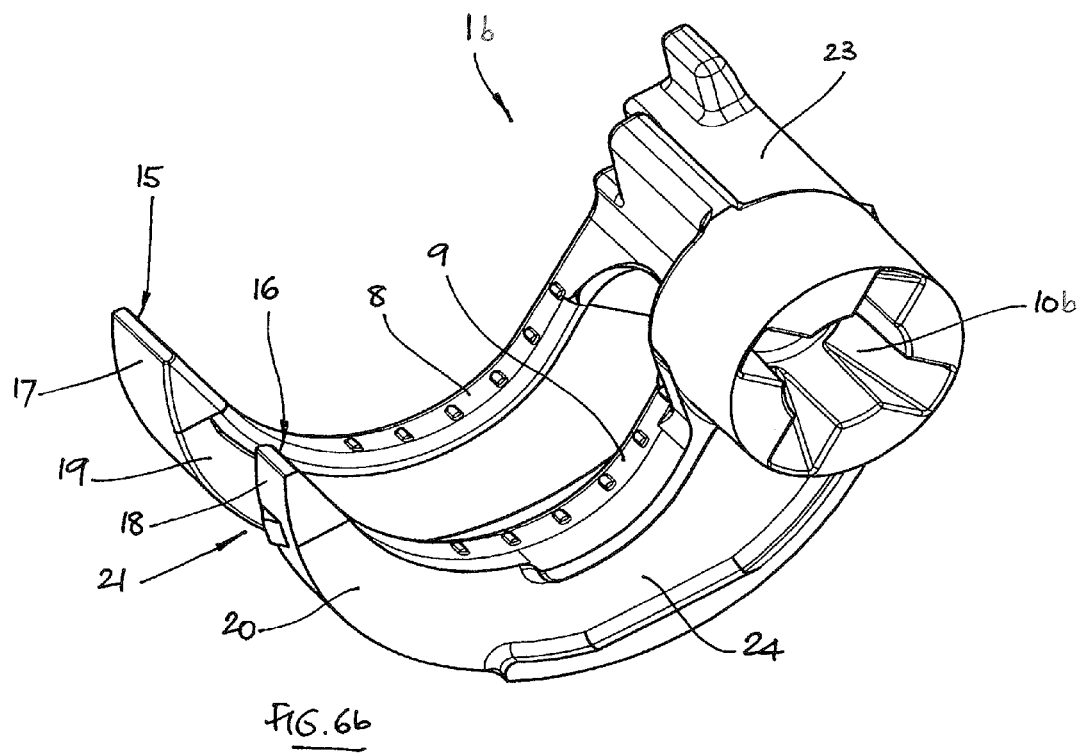
FIG. 6b is another perspective view of the third embodiment.

A third embodiment is shown in FIGS. 6a and 6b. The camming element 1b of the third embodiment is similar to the camming element 1a of the second embodiment with regard to the structure of the first 15 and second engagement elements 16, the slot 21, the first 17 and second 18 outer surfaces, and the first 8 and second 9 camming surfaces. The camming element 1b of the third embodiment is also similar to the camming element 1a of the second embodiment in that the torque coupling section 10b is radially displaced from the axis of the first 17 and second 18 outer surfaces. However, the camming element 1b of the third embodiment differs from that of the second embodiment in that there is no top plate 22, 22a. According to the third embodiment, the torque coupling section 10b is provided directly on the second engagement element 16, and preferably protrudes from the second engagement element 16.

In removing the top plate 22, 22a, the camming element 1b overcomes a prejudice in the art, which teaches that the top plate 22, 22a is necessary to conceal the first and second engagement members 15, 16. A further prejudice in the art teaches that the top plate 22, 22a is necessary to guide the camming element 1, 1a when it is rotated in use. However, this is not the case.

According to the third embodiment, the absence of the top plate 22, 22a means that the face 24 of the second wall portion facing away from the slot 21 and the second camming surface 9 are exposed when viewed axially. The absence of the top plate 22, 22a leads to a considerable saving in material and cost. Furthermore, it has been found that the removal of the top plate 22, 22a does not hinder the installation of the camming element 1, 1a, which can be guided sufficiently by the first and second outer surfaces 17, 18 of the first and second engagement elements 15, 16.

Although the camming element 1b of the third embodiment is described as similar to the camming element 1a of the second embodiment (which incorporates features of the first embodiment), the features concerning the absence of the top plate 22, 22a and location of the torque coupling section 10b of the camming element 1b of the third embodiment could also be applied to a camming element 1, 1a that does not have the coring described in the first embodiment. The torque coupling section 10b of this embodiment could be provided on a camming element 1b in which the jaws are not cored, or a camming element 1b that is cored between (inside) the jaws but not outside the jaws, or even a camming element 1b in which the width w of the first outer surface 17 is less than the thickness t of the first wall portion 19.

Embodiment 4

Figure 7:
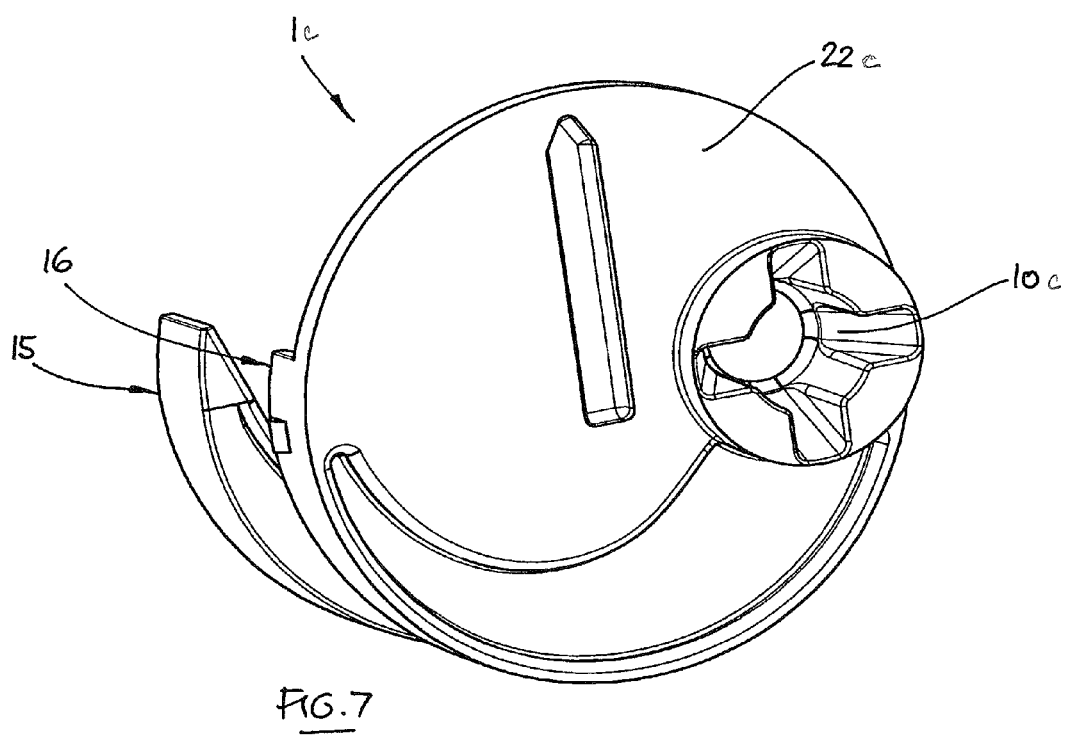
FIG. 7 is a perspective view of a fourth embodiment of a camming element according to the invention.

The embodiment shown in FIG. 7 is similar to previous embodiments in terms of its general configuration. The arrangement of the first 15 and second 16 engaging elements is essentially the same as in previous embodiments. The torque coupling section 10c is offset from the rotational axis of the camming element 1c, as in the second and third embodiments. The camming element 1c has a top plate 22c, as in the first and second embodiments. Here, however, the top plate 22c is slightly stepped down from the top surface of the element 1c. The top surface of the element 1c is represented by the upper surface of the torque coupling section 10c and is designed to lie essentially flush with the surface of the board or panel in use. The slight stepping down of the top plate 22c in this embodiment has several advantages. Firstly, it makes the top plate 22c more closely integral with the second engaging element 16. This gives the structure added strength. It also means that the top plate 22c lies in closer proximity to the line of action of the forces that the camming element 1c will experience in use. These are the forces that arise between the first 15 and second 16 engaging elements and the head 7 of the dowel 2 when the joint is tightened. This gives the camming element 1c greater resistance to tilting in use. This is because the circumferential edge of the top plate 22c is more closely aligned with the forces on the camming element 1c, giving it greater stability in its engagement with its mounting hole in the board or panel. This also helps to make a stronger joint.

The slight stepping down of the top plate 22 also facilitates the application of a cover cap (not shown) to conceal the element after the joint has been set.

Variations and Alternatives

The first 15 and second 16 engaging elements are not necessarily restricted to forming jaws, so long as they can achieve the function of camming the head 7 of a dowel 2. For example, the ends of the first 15 and second 16 engaging elements that are free in the disclosed embodiments could be connected to each other, with the slot 21 enlarged near these ends to admit the head 7 of the dowel 2.

The first and second caroming surfaces 8, 9 are described as curved. As used herein, curved is intended to include a substantially curved shape formed by a series of flat segments lying tangential to a curve.

The torque coupling section 10 is not particularly limited, and could be any section that would allow a torque to be applied to the camming member 1, and may include any combination of depressions or protrusions. Further examples include a slot for a flat-head screwdriver or a depression for a hex key.

The torque coupling section 10, 10a, 10b, 10c could be integrally formed with the second engagement element 16, and need not protrude past the second engagement element 16 in the axial direction. The torque coupling section 10, 10a, 10b, 10c may extend past the second engagement element 16 to the first engagement element 15. For example, the torque coupling element 10, 10a, 10b, 10c could include a hole for receiving a hex key, with the hole passing the whole length of the camming element 1, 1a, 1b, 1c. In the second and third embodiments, this hole could pass axially through the spine section 23.

Preferably, the camming element 1, 1a, 1b, 1c of the present invention is integrally formed, by a moulding process, for example. However, this is not essential, and other manners of production, and non-integrally formed camming elements 1 are also within the scope of the present invention.

The invention claimed is:

1. A camming element for a device for forming a joint between two members, the camming element comprising:
    a first engagement element having a first cylindrical portion including an outer surface, a first curved camming surface extending from the first cylindrical portion and having a circumferential extent, extending along the entirety of the first engagement element and a first wall portion between the outer surface of the first cylindrical portion and the first curved camming surface;
    a second engagement element having a second cylindrical portion including an outer surface, a second curved camming surface and a second wall portion formed between the outer surface of the second cylindrical portion and the second curved camming surface, with the second engagement element axially spaced and coaxial with the first engagement element, with the outer surfaces of the first and second cylindrical portions defining an axis; and
    a slot between the first and second engagement elements, wherein the first wall portion is axially facing away from the slot and is perpendicular to the axis from the first camming surface to the first cylindrical portion;
    wherein the outer surface of the first cylindrical portion defines a constant width in an axial direction parallel to the axis along the entire extent of the first engagement element, wherein the width is greater than an axial thickness between the first wall portion and the slot along the circumferential extent of the first curved camming surface;
    with the first and second engagement elements rotatably mountable about the axis of the outer surfaces of the first and second cylindrical portions, in use, in a hole in one of the two members, with the first and second camming surfaces engageable, in use, with a head portion of a fastening element which is connectable, in use, to another of the two members, with rotation of the first and second engagement elements in a first direction serving, in use, to draw the two members together by action of the first and second camming surfaces pulling on the head portion of the fastening element.

2. A camming element as set forth in claim 1, wherein the outer surface of the first cylindrical portion extends beyond the first wall portion in a direction parallel to the axial direction and away from the second engagement element.

3. The camming element as set forth in claim 1, wherein a face of the first wall portion facing away from the second engagement element is cored.

4. A camming element as set forth in claim 3, further comprising a torque coupling section for applying a torque parallel to the axis of the outer surfaces of the first and second cylindrical portions.

5. A camming element as set forth in claim 4, wherein the second engagement element is between the torque coupling section and the first engagement element in the axial direction.

6. A camming element as set forth in claim 1, further comprising a torque coupling section for applying a torque parallel to the axis of the outer surfaces of the first and second cylindrical portions.

7. A camming element as set forth in claim 6, wherein the second engagement element is between the torque coupling section and the first engagement element in the axial direction.

8. A camming element as set forth in claim 6, wherein the torque coupling section is radially displaced from the axis of the outer surfaces of the first and second cylindrical portions.

9. A camming element as set forth in claim 8, wherein the torque coupling section projects axially from the second engagement element.

10. A camming element as set forth in claim 8, wherein a face of the second wall portion facing away from the slot and the second curved camming surface are exposed when viewed axially.

11. A camming element as set forth in claim 1, further comprising:
    a torque coupling section for applying a torque parallel to the axis of the outer surfaces of the first and second cylindrical portions;
    wherein the torque coupling section is radially displaced from the axis of the outer surfaces of the first and second cylindrical portions; and
    wherein a face of the second wall portion facing away from the slot and the second curved camming surface are exposed when viewed axially.

12. A camming element as set forth in claim 11, wherein the second engagement element is between the torque coupling section and the first engagement element in the axial direction.

13. A camming element as set forth in claim 11, wherein the torque coupling section projects axially from the second engaging element.

14. A camming element as set forth in claim 1, further comprising:
a plate element having a cylindrical outer surface and axially spaced from and coaxial with the first engagement element, with the second engagement element lying between the plate element and the first engagement element, with an axial length from the first engagement element to the plate element less than a depth of the hole in the one of the two members, wherein the plate element lies below a surface of the one of the two members.

15. A camming element as claimed in claim 14, wherein the plate element comprises a torque coupling section for applying torque to rotate the first and second engagement elements in use.

16. A camming element as claimed in claim 15, wherein the torque coupling section extends beyond the plate element and lies generally flush with the surface of the one of the two members in use.

17. A camming element as claimed in claim 16, wherein the torque coupling section is radially offset from the axis of the outer surfaces of the first and second cylindrical portions.

18. A camming element as claimed in claim 17, further comprising a cover cap for concealing the second engagement element in use.

19. A camming element as claimed in claim 15, wherein the torque coupling section is radially offset from the axis of the outer surfaces of the first and second cylindrical portions.

20. A camming element as claimed in claim 14, further comprising a cover cap for concealing the second engagement element in use.

* * * * *